April 17, 1962 L. M. WYATT 3,030,293
NUCLEAR REACTOR FUEL ELEMENTS
Filed Nov. 20, 1957 2 Sheets-Sheet 1

LESLIE MARK WYATT

April 17, 1962 L. M. WYATT 3,030,293
NUCLEAR REACTOR FUEL ELEMENTS
Filed Nov. 20, 1957 2 Sheets-Sheet 2

LESLIE MARK WYATT
Inventor

Attorneys

United States Patent Office 3,030,293
Patented Apr. 17, 1962

3,030,293
NUCLEAR REACTOR FUEL ELEMENTS
Leslie Mark Wyatt, Appleton, England, assignor to United Kingdom Atomic Energy Authority, London, England
Filed Nov. 20, 1957, Ser. No. 697,548
Claims priority, application Great Britain Nov. 23, 1956
5 Claims. (Cl. 204—193.2)

This invention relates to fuel elements for nuclear reactors such as gas cooled nuclear reactor like those known as the "Calder Reactors." The invention is primarily concerned with means for limiting adverse effects which may arise in fuel elements due to deformation of the fuel during its lifetime in a reactor. The deformation can appear as bowing, longitudinal growth and circumferential growth.

According to the invention a fuel element comprising a cylindrical fuel member enclosed in a protective can with longitudinal fins is provided with one or more helical fins extending beyond the longitudinal fins, the helical fins being slotted so as to fit betwen the longitudinal fins.

It is important that the helical fins should not cut the longitudinal fins as this would cause expansion of the fuel element to be taken principally in the wall of the fuel element can below the cuts, with a corresponding weakness. It is also important that the fins on the can should be longitudinal. If, for example, the can had helical fins with one or more longitudinal fins fitted on and into the spiral fins, longitudinal expansion of the element would distort the finning. Fuel elements according to the invention can tolerate longitudinal growth without highly stressed local areas arising in the can by movement of the longitudinal fin in the slots of the helical fins. Preferably the helical fins are spaced away from the can and the longitudinal fins to allow for radial growth of the fuel element.

Figure 1:
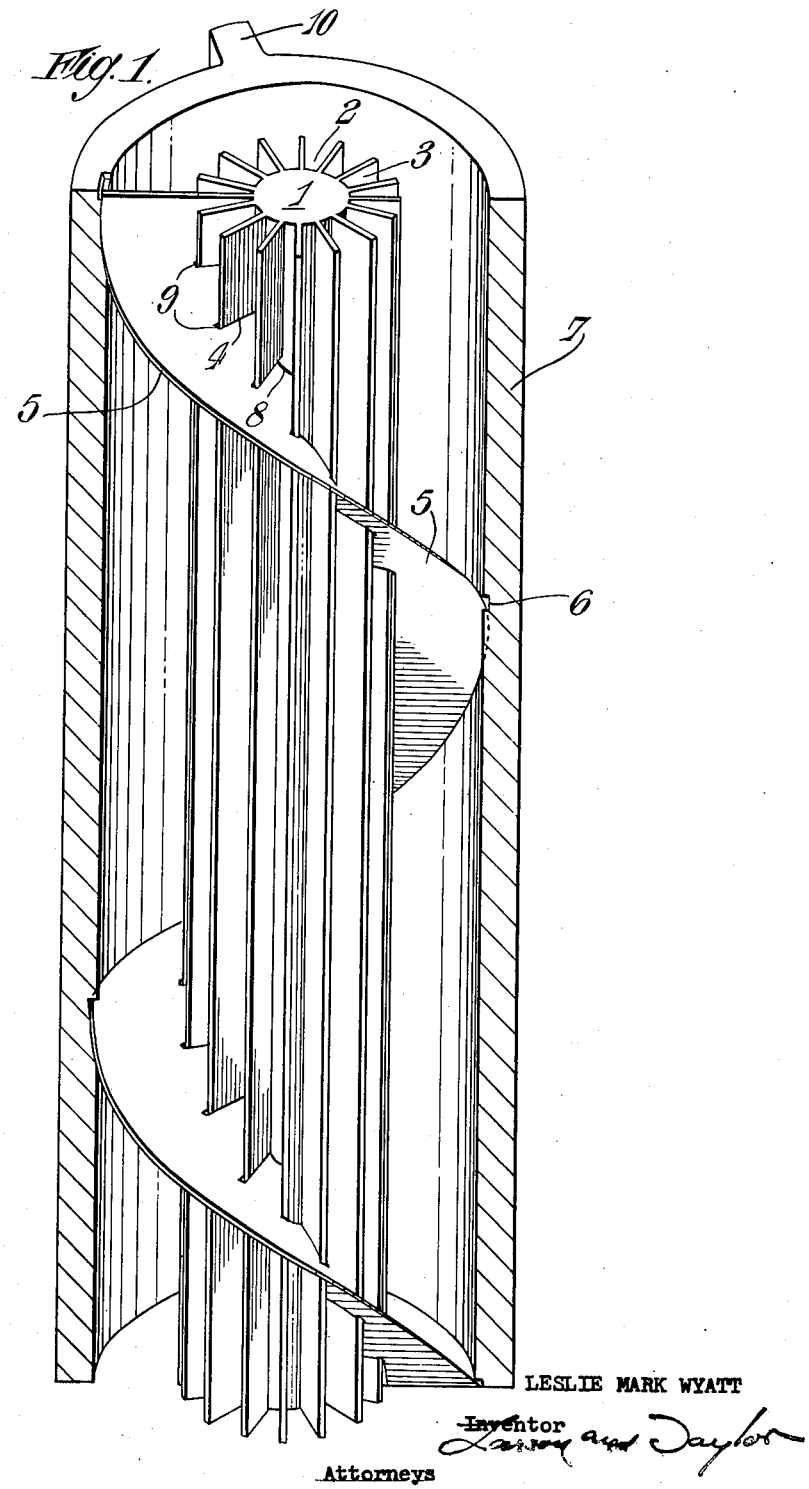
Figure 2:
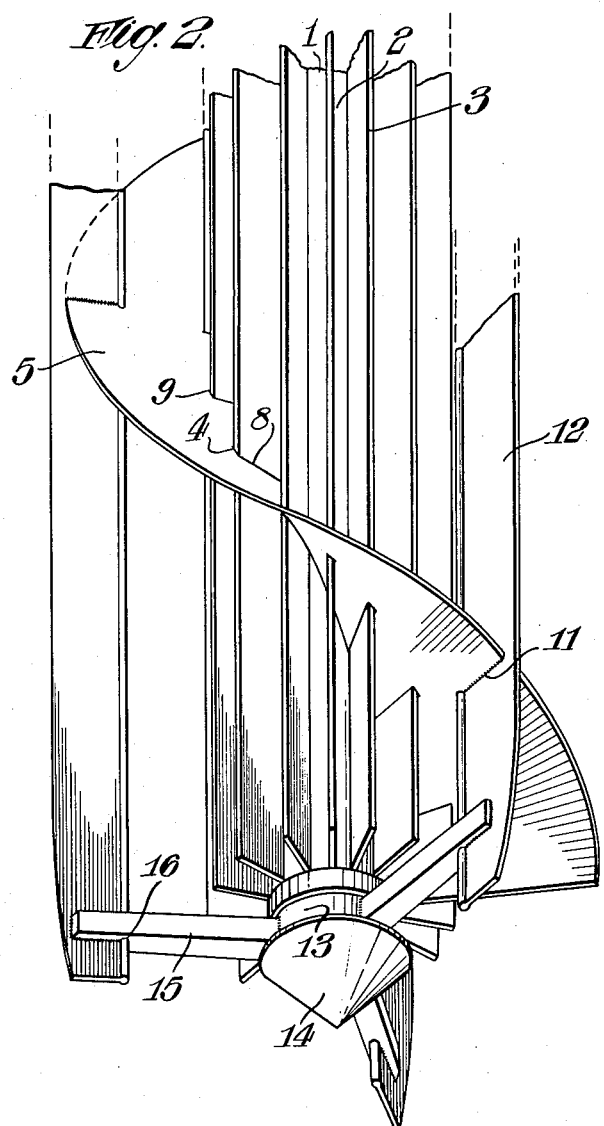

By way of example the invention will now be described with reference to the accompanying drawings wherein FIG. 1 is a cutaway isometric view of a fuel element supported in a sleeve and FIG. 2 is a fragmentary perspective view of a fuel element supported in longitudinal guide fins.

In FIG. 1 a fuel element 1 comprising a uranium rod in a protective can 2 has longitudinal fins 3. A continuous helical metal fin 5 with slots 4 cut into its inner edge 8 to accommodate the fins 3 is fitted over the fuel element 1. The inner edge 8 is arranged to be spaced away silghtly from the wall of the can 2 and the slots are cut deep enough to allow a space 9 between fins 3 and helical fin 5 so that radial expansion of the fuel element 1 can occur without restraint. The assembled fin 5 and element 1 is fitted into a groove 6 in a graphite sleeve 7 having a key 10 to prevent the sleeve rotating under the forces of a coolant gas passing inside the sleeve. To prevent the fin 5 and fuel element 1 rotating in the sleeve 7 the fuel elements are stacked in strings so that the end faces of adjacent sleeves 7 cover the ends of the groove 6. Alternatively, the fin 5 is reduced slightly in length and a stop is inserted in the groove 6 near its ends. In FIG. 2 (using the same reference numerals as FIG. 1 for the same components) the assembled fin 5 and fuel element 1 is fitted into grooves 11 in longitudinal guide webs 12, the fin 5 being welded to the fins 12 to give the structure rigidity. An end cap 13 fitted on the bottom of the fuel element 1 comprises a cone 14 which is arranged to mate with an end cap comprising a conical cup on the top of the fuel element immediately below. The end caps carry spider arms 15 having grooves 16 which fit about the fins 12. The lower spider arms are welded to the fins 12. The upper spider arms are a sliding fit to allow for longitudinal growth of the fuel element relative to the helical fins 5.

The fuel element in FIG. 1 may have end caps and spider arms similar to that shown in FIG. 2 the spider arms in that case being fixed to the sleeve 7.

The helical fin 5 serves to restrain bowing of the fuel element 1 whilst at the same time it makes no intersections in the fins 3 which could weaken the uniform strength of the can 2. Longitudinal growth of the fuel element 1 can take place without restraint and without imposing any curvature or deflection of the fins. Radial growth in the fuel element 1 is also allowed for by spacing the helical fins 5 away from the can 2 and longitudinal fins 3. In addition to the mechanical advantages arising from the fin 5, the heat transfer characteristics of the fuel element should not be impaired. Whilst the pressure drop along the element is increased by the helical fin 5 (and hence the pumping power in a reactor charged with such elements also increases) the complex motion of coolant over the fins combined with the avoidance of streaming along the fins is considered to provide a more uniform temperature distribution of coolant across the channel with consequent gain of heat in the outlet coolant for given limiting temperature conditions in the fuel element 1.

The helical fin 5 may be of graphite and made integral with the sleeve 7.

I claim:

1. A nuclear reactor fuel element comprising an elongated cylindrical nuclear fuel member, a protective can for and in close heat transfer relation with said fuel member, uninterrupted longitudinal fin members integral with said can and having substantial radial depth compared with their width, and at least one helical fin the inner edge of which passes around but is separate from the can and has a series of slots through which the longitudinal fin members extend, the radial depth of the helical fin being substantial compared to its width and sufficient to extend beyond the longitudinal fin members, and the radial depth of the slots being sufficient to provide free space between the longitudinal fin members and the helical fin.

2. A nuclear reactor fuel element according to claim 1 further comprising support means for holding the inner edge of the helical fin away from the can.

3. A nuclear reactor fuel element according to claim 2 wherein the support means is a graphite sleeve having a helical slot on its internal surface engaging with the outer edge of the helical fin.

4. A nuclear reactor fuel element according to claim 2 wherein the support means is a graphite sleeve and the helical fin is of graphite and integral with the sleeve.

5. A nuclear reactor fuel element according to claim 2 wherein the fuel member has radial arms at both ends and the support means is a series of longitudinal webs secured to the helical fin and to the arms at one end of the fuel member and slidable in the arms at the other end of the fuel member.

References Cited in the file of this patent

UNITED STATES PATENTS

| 1,734,136 | Kramer | Nov. 5, 1929 |
|---|---|---|
| 1,786,571 | Lonsdale | Dec. 30, 1930 |
| 1,838,105 | Murray | Dec. 29, 1931 |
| 1,993,539 | Anthony et al. | Mar. 5, 1935 |
| 2,267,027 | Hardgrove | Dec. 23, 1941 |
| 2,322,241 | Booth | June 22, 1943 |
| 2,418,191 | Parrish | Apr. 1, 1947 |
| 2,492,932 | Fausek et al. | Dec. 27, 1949 |

OTHER REFERENCES

Nucleonics, vol. 13, No. 6, June 1955, page 93. Copy in Library.

International Conference on Peaceful Uses of Atomic Energy, vol. 9, 1955, pages 221–230. Copy in Library.